(12) United States Patent  
Segi et al.

(10) Patent No.: US 7,412,989 B2  
(45) Date of Patent: Aug. 19, 2008

(54) SOLENOID VALVE

(75) Inventors: Masaya Segi, Okazaki (JP); Mikio Suzuki, Hekinan (JP); Masaru Suzuki, Chiryu (JP); Koichi Takanishi, Nishio (JP); Kaori Fujita, Kariya (JP)

(73) Assignee: JTEKT Corporation, Osaka (JP)

( * ) Notice: Subject to any disclaimer, the term of this patent is extended or adjusted under 35 U.S.C. 154(b) by 282 days.

(21) Appl. No.: 11/226,199

(22) Filed: Sep. 15, 2005

(65) Prior Publication Data

US 2006/0081298 A1    Apr. 20, 2006

(30) Foreign Application Priority Data

Oct. 14, 2004    (JP)    ............... 2004-300238

(51) Int. Cl.  
  *F15B 13/043*    (2006.01)
(52) U.S. Cl. ............... 137/625.64; 137/625.69; 251/50
(58) Field of Classification Search ............... 137/625.64–625.66, 625.25, 625.69, 625.55; 251/50, 53  
See application file for complete search history.

(56) References Cited

U.S. PATENT DOCUMENTS 5,868,167 A * 2/1999 Miki et al. ............... 137/625.65  
6,948,514 B1 * 9/2005 Kramer et al. ............ 137/15.21

2005/0133098 A1 6/2005 Ino et al.

FOREIGN PATENT DOCUMENTS

DE  198 29 549 A1  12/1999  
EP  1 323 963 A2   7/2003  
EP  1 580 469 A1   9/2005  
JP  2002-310322    10/2002

\* cited by examiner

*Primary Examiner*—Stephen M. Hepperle  
*Assistant Examiner*—Craig M Schneider  
(74) *Attorney, Agent, or Firm*—Oblon, Spivak, McClelland, Maier & Neustadt, P.C.

(57) ABSTRACT

In a solenoid valve 10, an annular oil groove 66 is formed at a portion corresponding to a spring chamber 56 on the external surface of a sleeve 19, a drain passage 68 is formed to make an upper part of the annular oil groove 66 communicate with the outside of an insertion bore 61, and a throttle hole 67 is provided at a lower part of the annular oil groove 66 for making the annular oil groove 66 communicate with the spring chamber 56. Since the annular oil groove 66 communicates with the outside of the insertion bore 61 at its upper part through the drain passage 68, it can be realized to store the operating oil to the height of the upper part of the annular oil groove 66, so that the operating oil can be reserved in the spring chamber 56 which communicates with the annular oil groove through the throttle hole 67. Further, the operating oil is supplied from a feedback port 48 next to the spring chamber 56 through a clearance between the spool valve 19 and a valve hole 18. Thus, the solenoid valve 10 is able to secure the damping effect of the working oil on the spool valve 19 and a plunger 17 and to suppress the self oscillation even while being operated in the atmosphere for a long time.

8 Claims, 8 Drawing Sheets

SOLENOID VALVE

This application is based on and claims priority under 35 U.S.C. 119 with respect to Japanese Application No. 2004-300238 filed on Oct. 14, 2004.

BACKGROUND OF THE INVENTION

1. Field of the Invention

The present invention relates to a solenoid valve in which a spool valve is operated by the axial movement of a plunger corresponding to electric current applied to a coil.

2. Discussion of the Related Art

In solenoid valves of the type that a plunger is moved by a magnetic attraction force upon energization of a coil of a linear solenoid and that the areas of fluid paths opening to a valve hole are controlled by a spool valve which is moved within the valve hole as a result of the plunger being moved, variation is made volume of a rear end chamber to which the plunger enters its rear end portion upon movement thereof. It is described in Japanese unexamined, published patent application No. 2002-310322 to provide a respiration passage so that the operating oil can be flown into or away from the rear end chamber with the variation in the volume. That is, in the solenoid valve 1 described in the aforementioned Japanese application, a plunger 17 is slidably inserted into a stationary core 12 which has a receiving section 13, a magnetic resistance section 15 and an attraction section 14 in turn formed thereon, a coil 20 is contained in an annular space which is defined between the external surface of the stationary core 12 and the internal surface of a yoke 11, and a valve housing (sleeve) 41 of a spool control valve 40 is fixed to a forward end of the yoke 11. A spool 50 is slidably inserted into the valve housing 14 and is urged by a spring force toward abutting engagement with the plunger 17. A cover 30 is fixed to a rear end of the yoke 11 to cover a space 100 to which the rear end surface of the plunger 17 is exposed. The volume of the space 100 varies when the plunger 17 is moved by being magnetically attracted upon energization of the coil 20 of the linear solenoid 10. A respiration passage 101 is formed in the cover 30 for enabling the operating oil to flow into or out the space 100 in dependence on the variation in the volume of the space 100.

In the solenoid valve 1 described in the aforementioned Japanese application, by making the operating oil flow to and from the space 100, a damping effect on the movement of the plunger 17 by the action of the operating oil remaining in the space 100 is given in addition to the action of absorbing the volume variation due to the movement of the plunger 17. When the solenoid valve 10 is operated transitionally as is the case of ON/OFF operation of the coil 20, the plunger 17 and the spool 50 are moved sharply, and a surge pressure attendant on the sharp motion causes the plunger 17 and the spool 50 to generate the self oscillation. The self oscillation is suppressed by the damping effect of the operating oil reserved in the space 100 against the movement of the plunger 17.

Generally, the solenoid valve 1 described in the aforementioned Japanese application is used to be laid within an oil pan or the like storing the operating oil for an electronically controlled automatic transmission of a vehicle, with the axis of the plunger 17 extending horizontally.

However, in dependence on the driving state of the vehicle, it may be the case that the oil surface of the operating oil inside the oil pan comes down to be lower than the solenoid valve 1. In this case, the solenoid valve 1 is kept to operate for a long time in the atmosphere. In the solenoid valve 1 of the construction as described in the aforementioned Japanese application, the operating oil is discharged through the respiration passage 101 during the long time operation in the atmosphere, but no operating oil is supplied from outside to the space 100. Therefore, the damping effect of the operating oil against the movement of the plunger 17 cannot be achieved, whereby the solenoid valve 1 is liable to generate the self oscillation.

SUMMARY OF THE INVENTION

Accordingly, it is a primary object of the present invention to provide an improved solenoid valve capable of securing the damping effect of operating oil against a spool valve and a plunger even during the operation in the atmosphere over a long period of time and hence, of suppressing the self oscillation.

Briefly, according to the present invention, there is provided a solenoid valve of the normally closed type, which comprises a solenoid section having a plunger axially attracted in dependence on electric current applied to a coil; a sleeve joined with the solenoid section and having a valve hole formed on the same axis as the plunger; a spool valve slidably fitted in the valve hole and urged to be brought into contact with the plunger by the resilient force of a spring retained in a spring chamber formed at a bottom portion of the valve hole, the spool valve being movable together with the plunger for controlling flow path areas of a supply port, an output port and a main drain port which open to the valve hole; a valve body having an insertion bore which is formed to pass therethrough and in which the sleeve is fitted to extend its axis approximately horizontally; a feedback port opening to the valve hole to be next to the spring chamber for leading a controlled pressure output from the output port, to a feedback land portion which is formed on the spool valve to have an area difference; wherein when the plunger is axially attracted to move the spool valve upon energization of the coil, the area of a flow path from the supply port to the output port is gradually increased as the area of a flow path from the output port to the main drain port is gradually decreased, and wherein the solenoid valve further comprises an annular oil groove formed between the feedback port and an open end on the spring chamber side of the insertion bore of the valve body and at a portion corresponding to the spring chamber on the external surface of the sleeve; a drain passage formed on the external surface of the sleeve to extend from the annular oil groove to an end of the sleeve for making an upper part of the annular oil groove communicate with the outside of the insertion bore; and a respiration passage provided at a lower part of the annular oil groove for making the annular oil groove communicate with the spring chamber.

With this construction, since the upper part of the annular oil groove communicates with the outside of the insertion bore through the drain passage, the annular oil groove is able to store the operating oil to the height of the upper part thereof and hence, to reserve the operation oil in the spring chamber communicating therewith through the respiration passage. Thus, when the plunger is attracted to be axially moved in dependence on an electromagnetic force exerted thereon as the coil is energized to control the controlled pressure from the output port and when the spool valve is moved together with the plunger against the resilient force of the spring, the spool valve is prevented from generating the self oscillation by the damping effect of the operating oil reserved in the spring chamber.

Where the state continues for a long time that the plunger and hence, the spool valve are kept stopped at one stroke end thereof as a result of applying the maximum control current to the coil in order to keep the controlled pressure from the output port high, the operating oil under the highest controlled pressure which is supplied from the output port to the feedback port flows into the spring chamber through a clearance between the spool valve and the valve hole, is then supplied from the spring chamber through the respiration passage to the annular oil groove, and is further discharged to the outside of the insertion bore through the drain passage. Also where the state continues for a long time that the spool valve is kept stopped at the other stroke end thereof as a result of applying the minimum control current to the coil in order to keep the controlled pressure from the output port low, the operating oil under the lowest controlled pressure supplied to the feedback port flows into the spring chamber through the clearance between the spool valve and the valve hole. Accordingly, it can be realized to continuously supply and reserve the operating oil into the spring chamber even where the state continues for a long time that the solenoid valve is exposed to the atmosphere with the spool valve stopped in an initial state. Thus, when moved from the stop state, the spool valve can advantageously be prevented from generating the self oscillation by the damping effect of the operating oil reserved in the spring chamber.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

DETAILED DESCRIPTION OF THE PREFERRED EMBODIMENTS

Hereafter, a solenoid valve 10 of the normally closed type in a first embodiment according to the present invention will be described with reference to FIG. 1. The solenoid valve 10 is composed primarily of a solenoid section 11 and a spool control valve 12 joined with the solenoid section 11. The solenoid section 11 is provided with a yoke 13 and a core 14 which are arranged in series on a common axis, a coil body 15 having a coil 29 covered with resin, a cover 16 fitted on the external surface of the coil body 15 and constituting a stationary member of the solenoid together with the yoke 13 and the core 14, a plunger 17 closely fitted in a through hole 21 of the yoke 13 to be moved by an electromagnetic force, and the like. The spool control valve 12 is provided with a sleeve 19 joined with the core 14 and formed with a valve hole 18 and a spool valve 20 slidably inserted into the valve hole 18 for controlling the flow path areas of a supply port 55, an output port 51 and a main drain port 54 which open to the valve hole 18, and the like. The spool valve 20 is held in contact with the plunger 17 by means of a resilient force of a spring 32 which is received in a spring chamber 56 formed at a bottom portion of the valve hole 18 and is movable together with the plunger 17. The output port 51 is provided for outputting a controlled pressure.

The yoke 13 and the core 14 have through holes 21, 22, cylindrical portions 23, 24 and flange portions 25, 26 respectively formed thereon. A cylindrical member 27 made of non-magnetic material is fitted on the cylindrical portions 23, 24 to arrange the yoke 13 and the core 14 in series on the common axis. The cylindrical member 27 is held in contact at its opposite end surfaces with end surfaces of the yoke 13 and the core 14 which end surfaces are inside the flange portions 25, 26, thereby to provide a gap 28 as magnetic resistance section between facing end surfaces of the cylindrical portions 23, 24. The coil body 15 which is constituted by covering the coil 29 with a resin member 30 is fitted on the cylindrical portions 23, 24 of the yoke 13 and the core 14 through the cylindrical member 27. The bottomed, cylindrical cover 16 made of non-magnetic material is fitted at its cylindrical internal surface on an external surface made of resin of the coil body 15 and is kept in abutting engagement with the external surface of the flange portion 25 of the yoke 13. Thus, the cylindrical cover 16 together with the core 14, the yoke 13 and the plunger 17 constitutes a magnetic circuit surrounding the coil body 15.

A rear end chamber 35 is defined between the rear end surface of the plunger 17 and the bottom surface of the cover 16. The rear end chamber 35 is in communication with the outside of the cover 16 through a communication aperture 37 formed in the cover 16.

The core 14 and the sleeve 19 and hence, the solenoid section 11 and the spool control valve 12 are joined by joining an opening end portion of the cover 16 with the flange portion 19a of the sleeve 19 by caulking with contact being held between an outer end surface of the flange portion 26 of the core 14 and a rear end surface of the sleeve 19.

The yoke 13 and the core 14 housed in the cover 16 are axially fixed by the cylindrical member 27 between the bottom portion of the cover 16 and the flange portion 26 of the sleeve 19 with the gap 28 being secured between the yoke 13 and the core 14.

The sleeve 19 is inserted into an insertion bore 61 which is formed horizontally in a valve body 60. The valve body 60 is contained in an oil pan for an electronically controlled automatic transmission (not shown), and the insertion bore 61 is made as an open bore which passes through the valve body 60 to open outside at opposite ends thereof.

A valve hole 18 having a first valve hole 41 and a second valve hole 42 which are different in diameter is formed in the sleeve 19 in axial alignment with the through hole 22 of the core 14. The spool valve 20 slidably fitted in the valve hole 18 is formed thereon with first and second land portions 43, 44 which are fitted in the second valve hole 42 being larger in diameter than the first valve hole 41. The spool valve 20 is also formed with a stepped portion 46 fitted in the first valve hole 41, and an annular recess 47 is formed on the valve hole 18 in correspondence to the stepped portion 46. A feedback port 48 opens to the annular recess 47. The first land portion 43 and the second land portion 44 are formed to be apart by a predetermined distance from each other in the axial direction, and a small-diameter portion 49 is formed between the first and second land portions 43, 44. Another annular recess (output chamber) 50 is defined on the second valve hole 42 in correspondence to the small-diameter portion 49, and an output port 51 for outputting a controlled pressure opens to the annular recess 50. The output port 51 is in communication with an output passage 62 formed in the valve body 60. The output passage 62 communicates with a clutch chamber (not shown) and also communicates with the feedback port 48 through a feedback passage 63 formed in the valve body 60. Annular recesses 52 and 53 are formed on the second valve hole 42 in correspondence to respective end portions of the small-diameter portion 49 between the first and second land portions 43, 44. The main drain port 54 and a supply port 55 respectively open to the annular recesses 53 and 52. The main drain port 54 communicates with a drain tank (not shown) through a main drain passage 64 formed in the valve body 60, and the supply port is supplied with operating oil through a supply passage 65 formed in the valve body 60.

In the valve hole 18, the spring chamber 56 is provided to be next to the first valve hole 41, and the spring 32 is interposed between a plug 57 screwed in an open end of the spring chamber 56 and a forward end surface of the spool valve 20. The spool valve 20 is urged by the resilient force of the spring 32 toward the plunger 17 and is brought into abutting engagement with the plunger 17 at a rod portion 58 protruding from a rear end surface of the second land portion 44 of the spool valve 20 to be moved together with the plunger 17.

An intermediate chamber 59 including the through hole 22 of the core 14 is defined between a forward end surface of the plunger 17, which is slidably and closely fitted in the through hole 21 of the yoke 13, and the second land portion 44 of the spool valve 20, and the rod portion 58 passes through the intermediate chamber 59 to be held in contact with the plunger 17.

Figure 2:
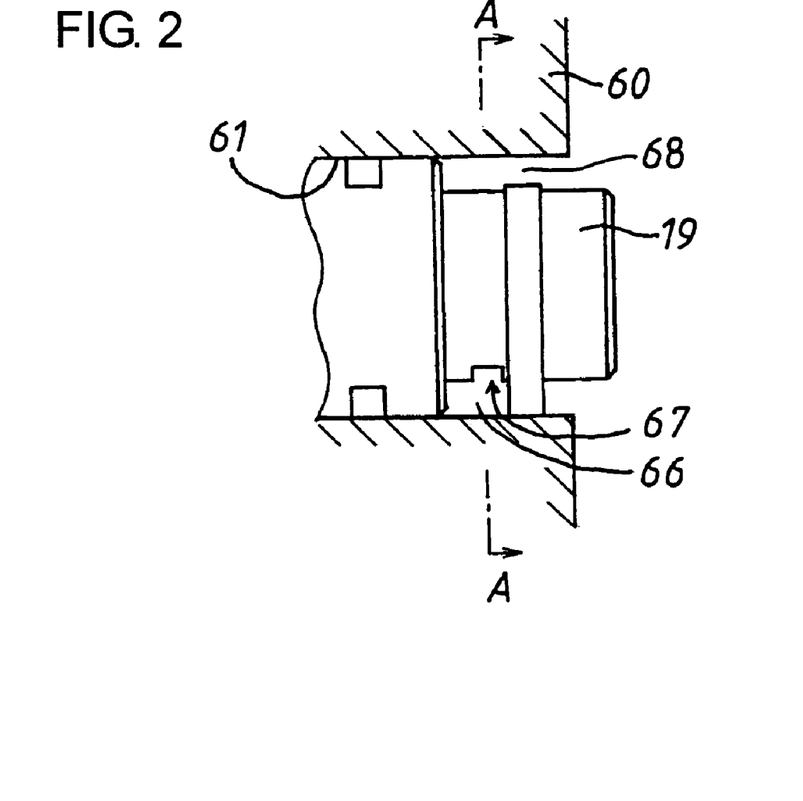
FIG. 2 is an enlarged fragmentary view of a part of the solenoid valve shown in FIG. 1.
Figure 3:
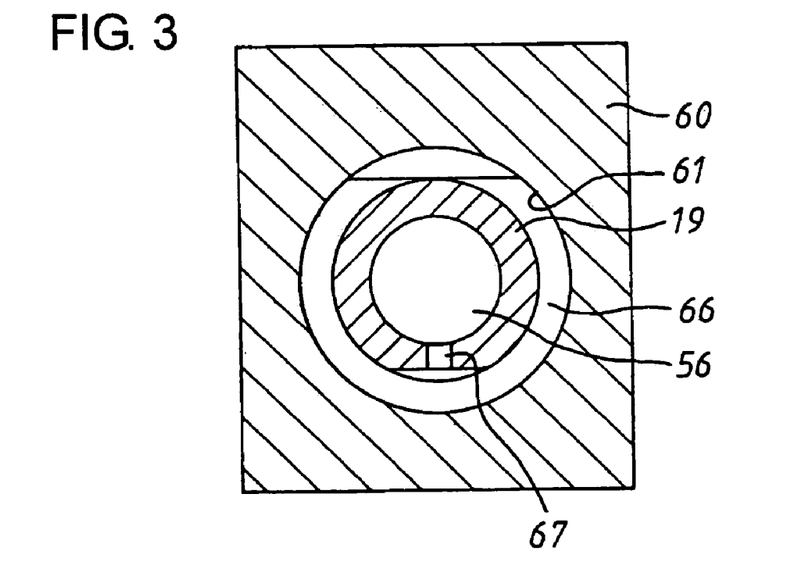
FIG. 3 is a cross-sectional view taken along the line A-A in FIG. 2.

Around the spring chamber 56 of the sleeve 19, an annular oil groove 66 is formed to be next to the feedback port 48. As shown in FIGS. 2 and 3, the annular oil groove 66 and the spring chamber 56 communicate with each other through a throttle hole (respiration hole) 67 which is formed to open to a lower part of the spring chamber 56 as well as to a lower part of the annular oil groove 66. A drain passage 68 communicating with the outside of the insertion bore 61 opens across a wall portion which radially protrudes from the sleeve 19 on the forward open end side of the insertion bore 61, at an upper part of the annular oil groove 66. This can be realized by, e.g., cutting away an upper part of the wall portion or flange defining the annular oil groove 66, as best shown in FIGS. 2 and 3. Thus, the annular oil groove 66 is able to store the operating oil therein to the height at which the drain passage 68 opens. The spring chamber 56 is kept filled with the operating oil in the state that the operating oil is stored in the annular oil groove 66. The throttle hole (respiration hole) 67 provides a throttle resistance in communication of the lower part of the spring chamber 56 with the lower part of the annular oil groove 66 and thus, regulates the speed at which the operating oil flows between the spring chamber 56 and the annular oil groove 66 together with movement of the spool valve 20. That is, as the coil 29 is energized to control the controlled pressure from the output port 51, the plunger 17 is attracted to be axially moved in dependence on an electromagnetic force exerted thereon, and the spool valve 20 is moved together with the plunger 17 against the resilient force of the spring 32. At this time, the throttle hole (respiration hole) 67 regulates the damping effect of the operating oil acting on the spool valve 20. The aperture diameter of the throttle hole 67 is properly set based on the relation between the viscosity of the operating oil and the damping effect to be applied on the spool valve 20.

The operation of the solenoid valve 10 in the first embodiment as constructed above will be described hereinafter. In the de-energized state of the coil 29, the plunger 17 and the spool valve 20 are pressured by means of the resilient force of the spring 32, so that the plunger 17 is held in abutting engagement with the bottom surface of the cover 16, as shown at the upper half in FIG. 1. In this state, the supply port 55 remains closed by the first land portion 43, and the output port 51 remains blocked from the communication with the supply port 55 but in communication with the main drain port 54 to set the controlled pressure to zero. Because of the controlled pressure from the output port 51 being zero, the feedback port 48 also has the controlled pressure being zero.

In this state, the annular oil groove 66 is in communication at its upper part with the outside of the insertion bore 61 through the drain passage 68. Thus, the annular oil groove 66 is able to store the operating oil to the level or height of its upper part, so that the operating oil is kept filled in the spring chamber 56 communicating with the annular oil groove 66 through the throttle hole 67. In the de-energized state of the coil 29, the plunger 17 and the spool valve 20 do not generate the self oscillation because the plunger 17 is not moved.

Then, when the minimum control current is applied to the coil 29 upon starting the control of the electronically controlled automatic transmission, the plunger 17 is attracted toward the core 14 to move the spool valve 20 against the resilient force of the spring 32. This causes the first land portion 43 in cooperation with the annular recess 52 to gradually increase the flow path area between the supply port 55 and the output port 51 and also causes the second land portion 44 in cooperation with the annular groove 53 to gradually decrease the flow path area between the output port 51 and the main drain port 54. As a result, the operating oil under the lowest controlled pressure is supplied from the output port 51 to the output passage 62 and is also supplied to the feedback port 48 through the feedback passage 63. The operating oil under the lowest controlled pressure supplied to the feedback port 48 is led into the annular recess 47 to act on the stepped portion 46, whereby a feedback force depending on the area difference in cross-section between the first land portion 43 and the stepped portion 46 is exerted on the spool valve 20 in the same direction as the resilient force of the spring 32 acts. The spool 20 is held at the position where a force made by adding the feedback force to the resilient force of the spring 32 balances with the attraction force with which the core 14 attracts the plunger 17 in correspondence to the value of electric current applied to the coil 29. Accordingly, the controlled pressure is controlled to be increased with an increase in the control electric current applied to the coil 29.

When led into the annular recess 47, the operating oil under the lowest controlled pressure flows into the spring chamber 56 through a clearance between the spool valve 20 and the valve hole 18. The operating oil flown into the spring chamber 56 is supplied to the annular oil groove 66 through the throttle hole 67, and an excess part of the operating oil is discharged from the annular oil groove 66 through the drain passage 68 to the outside.

Further, the controlled pressure of the operating oil increases with the increase of the electric current applied to the coil 29, and the increase in the controlled pressure results in increasing the flow volume of the operating oil which flows into the spring chamber 56 through the clearance between the spool valve 20 and the valve hole 18 to be supplied to the annular oil groove 66 through the throttle hole 67.

Therefore, where the state continues for a long time that the plunger 17 and hence, the spool valve 20 remain stopped at one stroke end thereof as a result of applying the maximum control current to the coil 29 in order to keep the controlled pressure from the output port 51 high, the operating oil under the maximum controlled pressure which is supplied to the feedback port 48 through the feedback passage 63 communicating with the output port 51 is flown into the spring chamber 56 through the clearance between the spool valve 20 and the valve hole 18 and is further supplied from the spring chamber 56 through the throttle hole 67 to the annular oil groove 66, so that the excess part is discharged outside through the drain passage 68. Also where the state continues for a long time that the spool valve 20 remains stopped at the other stroke end thereof as a result of applying the minimum control current to the coil 29 in order to keep the controlled pressure from the output port 51 low, the operating oil under the lowest controlled pressure supplied to the feedback port 48 flows into the spring chamber 56 through the clearance between the spool valve 20 and the valve hole 18. Accordingly, it can be realized to continuously supply and reserve the operating oil in the spring chamber 56 even where the state continues for a long time that the solenoid valve 10 is exposed to the atmosphere with the spool valve 20 stopped in an initial state. This advantageously prevents the spool valve 20 from generating the self oscillation by the damping effect of the operating oil reserved in the spring chamber 56 when the spool valve 20 is moved from the stop state.

Second Embodiment

Figure 4:
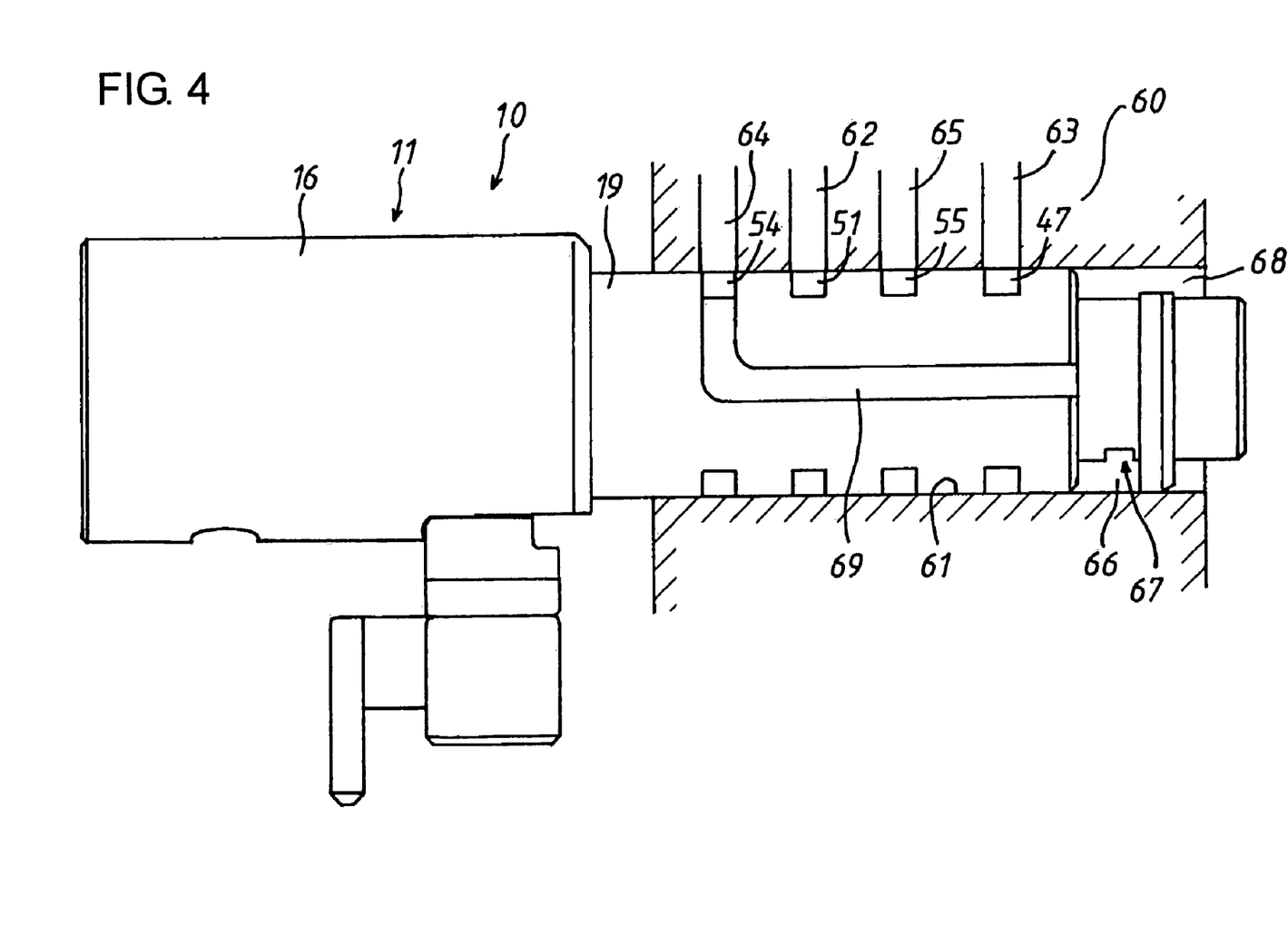
FIG. 4 is a partly sectional view of another solenoid valve in a second embodiment according to the present invention.

Next, description will be made regarding a solenoid valve 10 of the normally closed type in a second embodiment according to the present invention. The second embodiment features making the communication of the main drain port 54 with the annular oil groove 66 as compared with the solenoid valve 10 in the foregoing first embodiment shown in FIG. 1. Specifically, as shown in FIG. 4, the external surface of the sleeve 19 has formed thereon a communication groove 69 which makes the main drain port 54 and the annular oil groove 66 communicate with each other.

As described earlier with reference to FIG. 1, the main drain port 54 communicates with the supply port 51 through the annular recess 50 when the minimum control current is applied to the coil 29, and with the increase of the control electric current to the coil 29, the second land portion 44 in cooperation with the annular recess 53 gradually decreases the flow path area between the output port 51 and the main drain port 54. Thus, at the time of the application of the minimum control electric current, much volume of the operating oil flows into the main drain port 54 and is discharged from the main drain passage 64 to be supplied to the annular oil groove 66 through the communication groove 69. With the increase of the control electric current, the flowing of the operating oil into the main drain port 54 decreases to also decrease the operating oil supplied to the annular oil groove 66 through the communication groove 69. However, with the increase of the control electric current, the flow volume of the operating oil which flows into the spring chamber 56 through the clearance between the spool valve 20 and the valve hole 18 increases to be supplied to the annular oil groove 66 through the throttle hole 67. Thus, during the application of the maximum control electric current to the coil 29, the controlled pressure acting within the feedback port 54 causes the operating oil to be supplied from the clearance between the spool valve 20 and the valve hole 18 to the spring chamber 56, from which the operating fluid is supplied to the annular oil groove 66 through the throttle hole 67. Further, during the application of the minimum control electric current to the coil 29, the controlled pressure within the feedback port 48 lowers, in which case the operating oil is supplied from the communication groove 69 communicating with the main drain port 54 to the annular oil groove 66 even when the operating oil hardly flows from the feedback port 48 to the spring chamber 56. Consequently, during the operation of the solenoid valve 10, the operating oil is continuously supplied to the annular oil groove 66 at a stable flow volume all the time, so that the spring chamber 56 can be kept filled with the operating oil.

Third Embodiment

Next, description will be made regarding a solenoid valve 10 of the normally open type in a third embodiment according to the present invention. Being the same as that in the first embodiment, the construction of the solenoid section 11 in the third embodiment is therefore omitted for the sake of brevity.

Referring now to FIGS. 5(a) and 5(b), a sleeve 119 is inserted into an insertion bore 161 which is formed horizontally in a valve body 160. The valve body 160 is contained in an oil pan (not shown) for an electronically controlled automatic transmission (not shown), and the insertion bore 161 is made as an open bore which passes through the valve body 160 to open outside at opposite ends thereof. A valve hole 118 having a first valve hole 141 and a second valve hole 142 which are different in diameter is formed in the sleeve 119 in axial alignment with the through hole 22 of the core 14. A spool valve 120 slidably fitted in the valve hole 118 is formed thereon with first and second land portions 143, 144 which are fitted in a first valve hole 141 being larger in diameter than the second valve hole 142, and is also formed thereon with a third land portion 145 fitted in the second valve hole 142. The second land portion 144 and the third land portion 145 are provided to be next to each other, between which a stepped portion 146 is formed. Between the first valve hole 141 and the second valve hole 142, an annular recess 147 is formed on the valve hole 118 in correspondence to the stepped portion 146. A feedback port 148 opens to the annular recess 147. The first and second land portions 143, 144 are formed to be apart by a predetermined distance from each other in the axial direction, and a small-diameter portion 149 is formed between the first and second land portions 143, 144. Another annular recess 150 is defined on the first valve hole 141 in correspondence to the small-diameter portion 149, and an output port 151 for outputting a controlled pressure opens to the annular recess 150. The output port 151 is in communication with an output passage 162 formed in the valve body 160. The output passage 162 communicates with a clutch chamber (not shown) and also communicates with the feedback port 148 through a feedback passage 163 formed in the valve body 160. Annular recesses 152 and 153 are formed on the first valve hole 141 in correspondence to respective end portions of the small-diameter portion 149 between the first and second land portions 143, 144. A main drain port 154 and a supply port 155 open respectively to the annular recesses 152 and 153. The main drain port 154 communicates with a main drain passage 164 communicating with a drain tank (not shown) formed in the valve body 160, and the supply port 155 communicates with a supply passage 165 to which the operating oil is supplied. An annular recess 171 is formed on the second valve hole 142 in correspondence to the third land portion 145, and a sub-drain port 172 opens to the annular recess 171. The sub-drain port 172 is in communication with a sub-drain passage 173 formed in the valve body 160. It is to be noted that the sub-drain port 172 is provided for preventing any foreign object from entering an intermediate chamber 159 referred to later as a result that the operating oil flows into the intermediate chamber 159 through a clearance between the valve hole 118 and the spool valve 120 when the controlled pressure acts at the feedback port 148.

In the valve hole 118, a spring chamber 156 is provided to be next to the first valve hole 141. A spring 132 is interposed between a plug 157 screwed in an open end of the spring chamber 156 and a forward end surface of the spool valve 120. The spool valve 120 is urged by the resilient force of the spring 132 toward the plunger 17 and is brought into abutting engagement with the plunger 17 at a rod portion 158 protruding from a rear end surface of the third land portion 145 of the spool valve 120 to be moved together with the plunger 17.

The intermediate chamber 159 including the through hole 22 of the core 14 is defined between a forward end surface of the plunger 17, which is slidably and closely fitted in the through hole 21 of the yoke 13, and the third land portion 145 of the spool valve 120, and the rod portion 158 passes through the intermediate chamber 159 to be held in contact with the plunger 17.

Around the spring chamber 156 of the sleeve 119, an annular oil groove 166 is formed to be next to the feedback port 148. The annular oil groove 166 and the spring chamber 156 communicate with each other through a throttle hole (respiration hole) 167 formed between a lower part of the spring chamber 156 and a lower part of the annular oil groove 166. A drain passage 168 communicating with the outside of the insertion bore 161 opens across a wall portion which radially protrudes from the sleeve 119 on the forward open end side of the insertion bore 161, at an upper part of the annular oil groove 166. This can be realized by, e.g., cutting away an upper part of the wall portion or flange defining the annular oil groove 166 in the same manner as described earlier with reference to FIGS. 2 and 3 in the foregoing first embodiment. Thus, the annular oil groove 166 is able to store the operating oil therein to the height at which the drain passage 168 opens. The spring chamber 156 is kept filled with the operating oil in the state that the operating oil is stored in the annular oil groove 166. The throttle hole (respiration hole) 167 provides a throttle resistance in communication of the lower part of the spring chamber 156 with the lower part of the annular oil groove 166 and thus, regulates the speed at which the operating oil flows between the spring chamber 156 and the annular oil groove 166 with movement of the spool valve 120. The lower part of the annular oil groove 166 is in communication with the main drain passage 164 through a lead passage 170 having a throttle resistance. The lead passage 170 can be formed by, e.g., cutting away a lower part of an annular wall or flange which partitions the main drain passage 164 from the annular oil groove 166.

Figure 5:
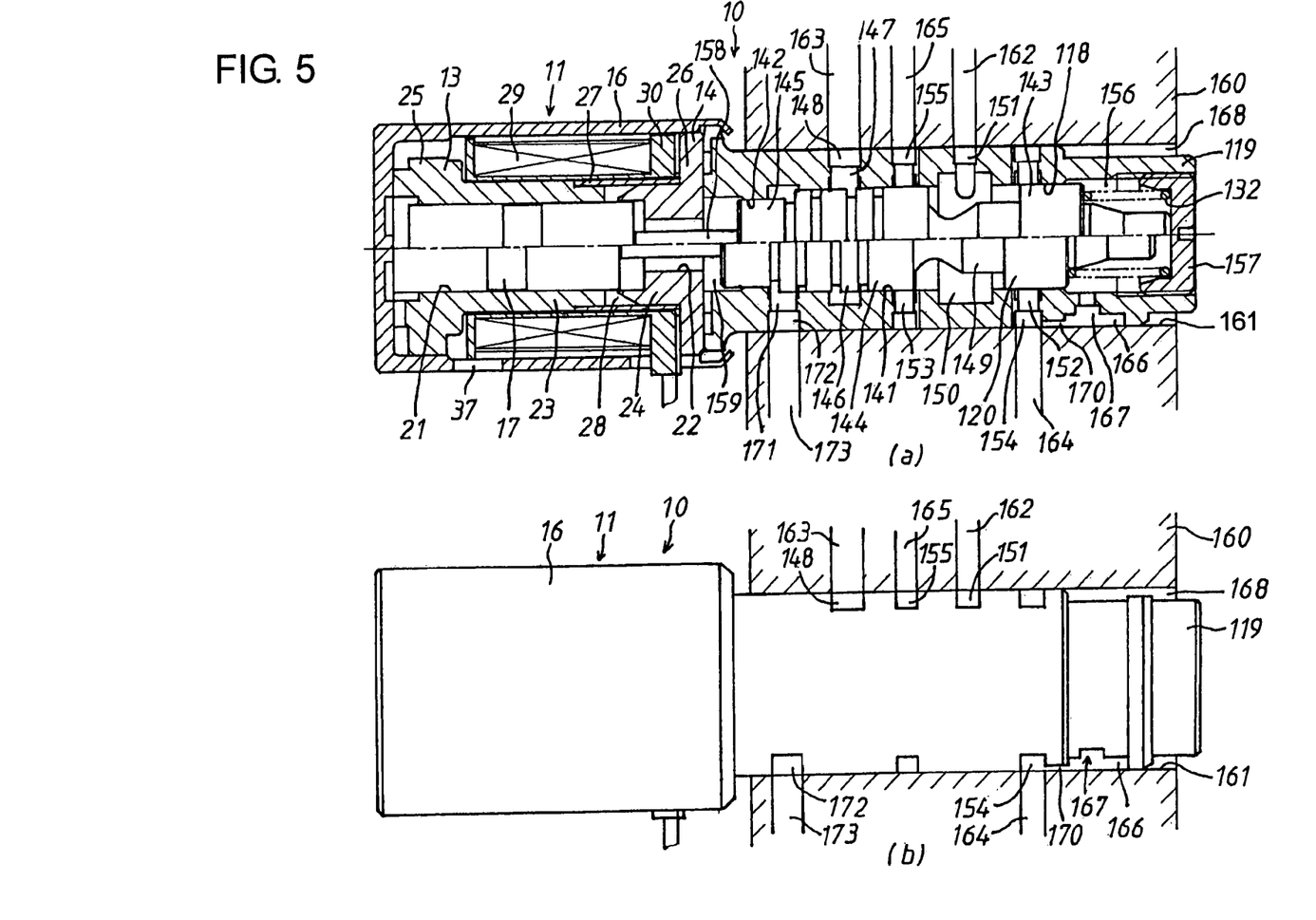
FIGS. 5(a) and 5(b) are sectional views respectively showing the inside constructions of a sleeve and a valve body in another solenoid valve in a third embodiment according to the present invention.

The operation of the solenoid valve 10 in the third embodiment as constructed above will be described hereinafter. In the de-energized state of the coil 29, the plunger 17 and the spool valve 120 are pressured by means of the resilient force of the spring 132, so that the plunger 17 is held in abutting engagement with the bottom surface of the cover 16, as shown at the lower half in FIG. 5(*a*). In this state, the output port 151 remains blocked from the communication with the main drain port 154 and is kept at a high pressure. Further, the annular oil groove 166 is in communication at its upper part with the outside of the insertion bore 161 through the drain passage 168. Thus, the annular oil groove 166 is able to store the operating oil to the level or height of its upper part, so that the operating oil is kept filled in the spring chamber 156 communicating with the annular oil groove 166 through the throttle hole 167. In the de-energized state of the coil 29, the plunger 17 and the spool valve 120 do not generate the self oscillation because the plunger 17 is not moved.

Then, when electric current is applied to the coil 29 upon starting the control of the electronically controlled automatic transmission, the plunger 17 is attracted toward the core 14 to move the spool valve 120 against the resilient force of the spring 132. This causes the second land portion 144 in cooperation with the annular recess 153 to gradually decrease the flow path area between the supply port 155 and the output port 151 and also causes the first land portion 143 in cooperation with the annular groove 152 to gradually increase the flow path area between the output port 151 and the main drain port 154. As a result, the controlled pressure of the operating oil supplied from the output port 151 to the output passage 162 is reduced as the spool valve 120 moves. The controlled pressure is also supplied to the feedback port 148 through the feedback passage 163. The operating oil supplied to the feedback port 148 is led into the annular recess 147 to act on the stepped portion 146, whereby a feedback force depending on the area difference in cross-section between the second land portion 144 and the third land portion 145 is exerted on the spool valve 120 in the direction against the resilient force of the spring 132. The spool 120 is held at the position where the resilient force of the spring 132 balances with a force made by adding the feedback force to the attraction force with which the core 14 attracts the plunger 17 in correspondence to the value of electric current applied to the coil 29. Accordingly, the controlled pressure is controlled to be decreased as the electric current applied to the coil 29 is increased.

In proportion to the increase of the electric current applied to the coil 129, the second land portion 144 in cooperation with the annular recess 153 gradually decreases the flow path area between the supply port 155 and the output port 151, and the first land portion 143 in cooperation with the annular recess 152 gradually increases the flow path area between the output port 151 and the main drain port 154. This results in increasing the operating oil discharged from the main drain port 154 to the main drain passage 164. Thus, the operating oil discharged to the main drain passage 164 communicating with the main drain port 154 flows through the lead passage 170 to the annular oil groove 166 to be supplied to the spring chamber 156 and to be discharged from the drain passage 168 to the outside of the insertion bore 161. Further, where the state continues for a long time that the plunger 17 and hence, the spool valve 120 are held stopped at one stroke end thereof as a result of applying the maximum control current to the coil 29 in order to keep the controlled pressure from the output port 151 low, the operating oil discharged to the main drain passage 164 communicating with the main drain port 154 flows through the lead passage 170 into the annular oil groove 166, is supplied to the spring chamber 156 through the throttle hole 167 and then is discharged from the drain passage 168 to the outside of the insertion bore 161. Also where the state continues for a long time that the spool valve 120 is held stopped at the other stroke end thereof as a result of applying the minimum control current to the coil 29 in order to keep the controlled pressure from the output port 151 high, the operating oil discharged to the main drain passage 164 decreases, in which case however it does not occur due to the throttle resistance of the lead passage 170 that the operating oil flows out of the annular oil groove 166 into the main drain passage 164. Rather, the operating oil flows a little from the main drain passage 164 into the annular oil groove 166 to be supplied to the spring chamber 156 through the throttle hole 167. Accordingly, it can be realized to continuously supply the operating oil to the spring chamber 156 and to reserve the operating oil therein even where the state continues for a long time that the solenoid valve 10 is exposed to the atmosphere with the spool valve 20 stopped in the initial state. This advantageously prevents the spool valve 120 from generating the self oscillation by the damping effect of the operating oil reserved in the spring chamber 156 when the spool valve 120 is moved from the stop state.

Fourth Embodiment

Figure 6:
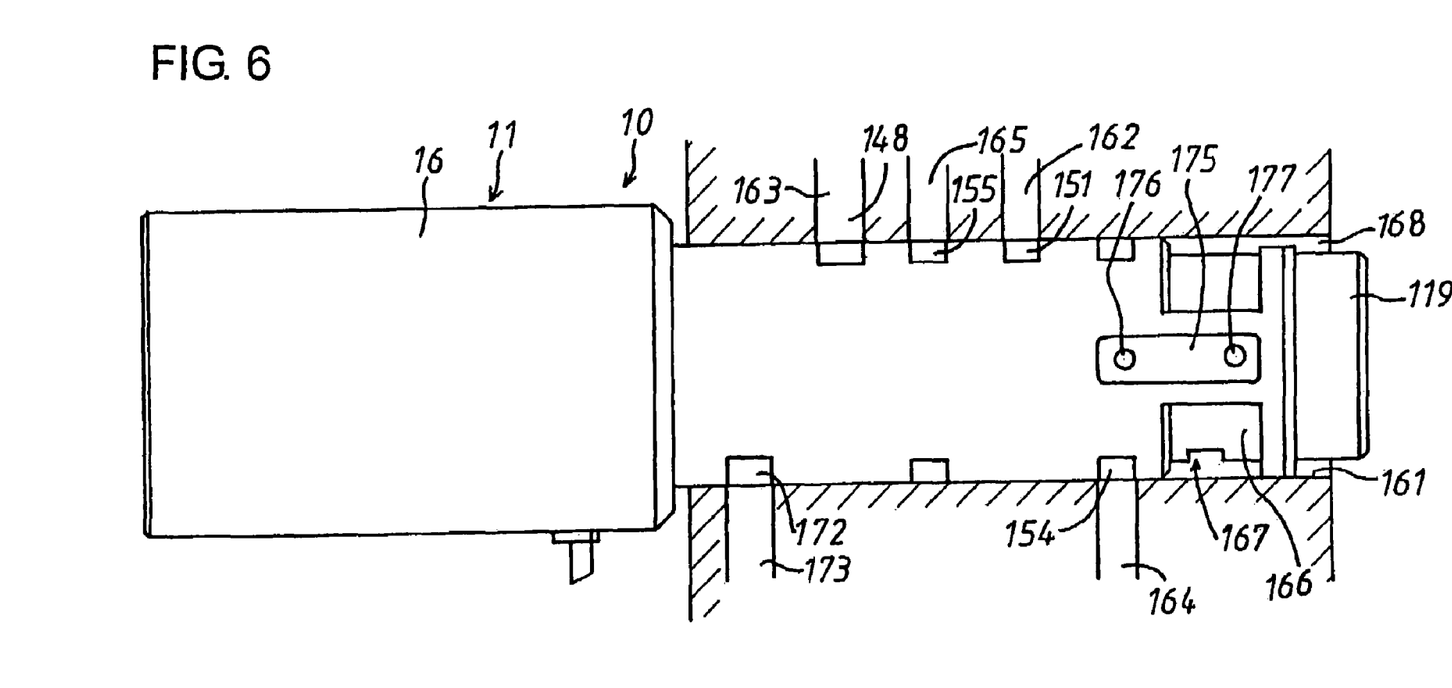
FIG. 6 is a partly sectional view of another solenoid valve in a fourth embodiment according to the present invention.

Next, description will be made regarding a solenoid valve 10 of the normally open type in a fourth embodiment according to the present invention. The solenoid valve 10 in the fourth embodiment differs from that in the third embodiment in that the annular recess 152 for the main drain port 154 is made to communicate with the spring chamber 156 instead of making the main drain passage 164 communicate with the annular oil groove 166 through the lead passage 170. Specifically, as shown in FIG. 6, a communication groove 175 is formed on the external surface of the sleeve 119 to extend from over the annular recess 152 for the main drain port 154 to over the spring chamber 156, and holes 176 and 177 are formed at opposite ends of the communication groove 175, wherein the hole 176 communicates with the annular recess 152, while the hole 177 communicates with the spring chamber 156.

Thus, where the state continues for a long time that the plunger 17 and hence, the spool valve 120 are held stopped at one stroke end thereof as a result of applying the maximum control current to the coil 29 in order to keep the controlled pressure from the output port 151 low, the operating oil under the lowest controlled pressure discharged from the output port 151 to the main drain port 154 flows into the spring chamber 156 through the hole 176, the communication groove 175 and the hole 177 and then is supplied to the annular oil groove 166 through the throttle hole 167. Also where the state continues for a long time that the spool valve 120 is held stopped at the other stroke end thereof as a result of applying the minimum control current to the coil 29 in order to keep the controlled pressure from the output port 151 high, the operating oil under the highest controlled pressure supplied to the main drain port 154 flows into the spring chamber 156 through the hole 176, the communication groove 175 and the hole 177 and then is supplied to the annular oil groove 166 through the throttle hole 167. Accordingly, it can be realized to continuously supply the operating oil to the spring chamber 156 and to reserve the operating oil therein even where the state continues for a long time that the solenoid valve 10 is exposed to the atmosphere with the spool valve 120 stopped in the initial state.

Fifth Embodiment

Figure 7:
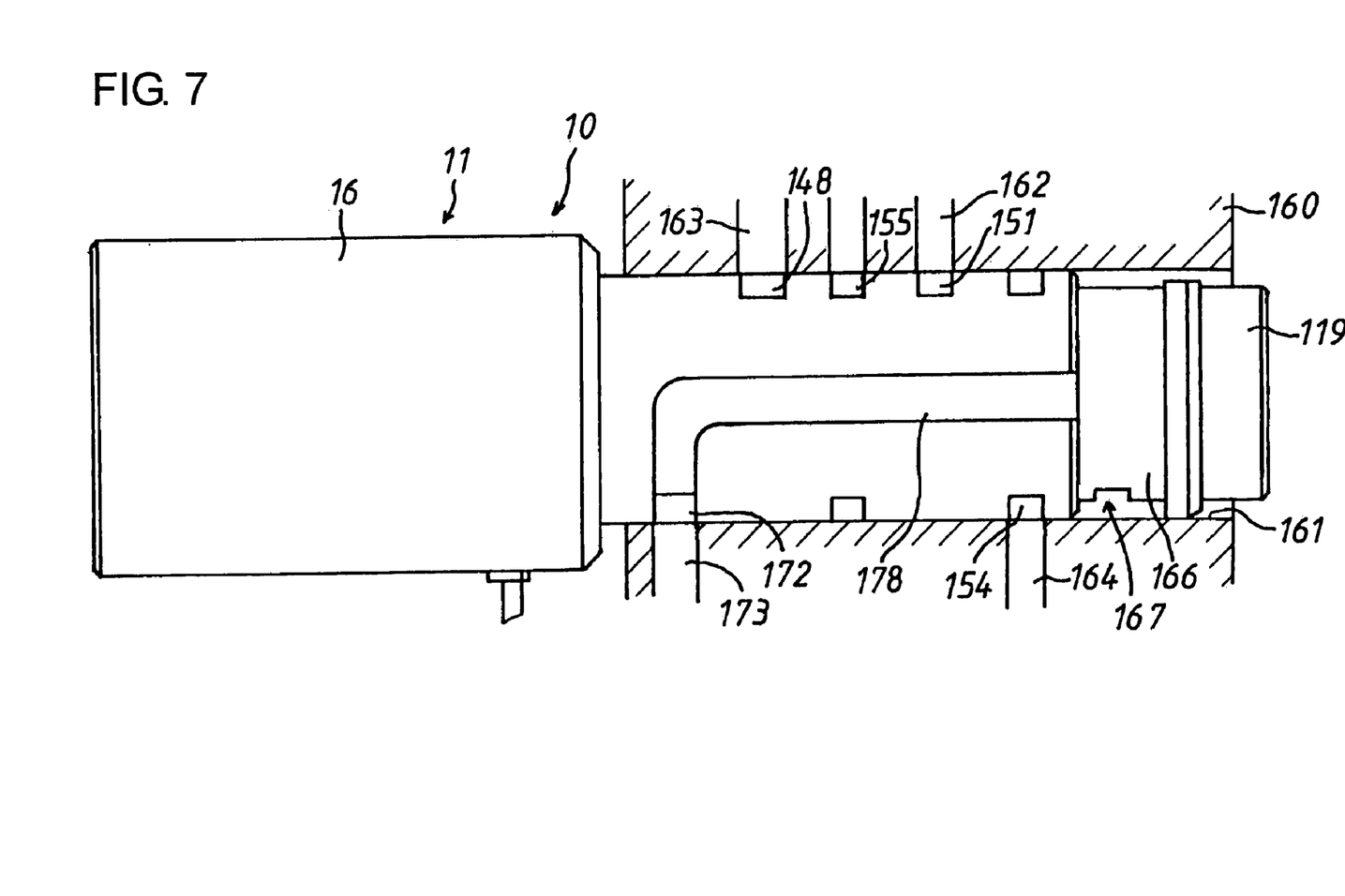
FIG. 7 is a partly sectional view of another solenoid valve in a fifth embodiment according to the present invention.

Next, description will be made regarding a solenoid valve 10 of the normally open type in a fifth embodiment according to the present invention. The solenoid valve 10 in the fifth embodiment differs from that in the third embodiment in that the sub-drain port 172 is made to communicate with an upper part of the annular oil groove 166 instead of making the main drain passage 164 communicate with the annular oil groove 166 through the lead passage 170. Specifically, as shown in FIG. 7, a communication groove 178 is formed on the external surface of the sleeve 119 to extend from the sub-drain port 172 to the spring chamber 156 and is in communication with the sub-drain passage 173 at one end thereof and the annular oil groove 166 at the other end thereof.

Thus, where the state continues for a long time that the plunger 17 and hence, the spool valve 120 are held stopped at one stroke end thereof as a result of applying the maximum control current to the coil 29 in order to keep the controlled pressure from the output port 151 low, the operating oil under the lowest controlled pressure supplied to the feedback port 148 flows into the sub-drain port 172 through the clearance between the spool valve 120 and the valve hole 118, and the operating oil then flows into the upper part of the annular oil groove 166 from the communication groove 178 which makes the sub-drain port 172 communicate with the annular oil groove 166, and is then supplied to the spring chamber 156 through the throttle hole 167. Also where the state continues for a long time that the spool valve 120 is held stopped at the other stroke end thereof as a result of applying the minimum control current to the coil 29 in order to keep the controlled pressure from the output port 151 high, the operating oil under the highest controlled pressure supplied to the feedback port 148 through the feedback passage 163 communicating with the output port 151 flows into the sub-drain port 172 through the clearance between the spool valve 120 and the valve hole 118, and the operating oil then flows into the upper part of the annular oil groove 166 from the communication groove 178 which makes the sub-drain port 172 communicate with the annular oil groove 166, and is then supplied to the spring chamber 156 through the throttle hole 167. Accordingly, it can be realized to continuously supply the operating oil to the spring chamber 156 and to reserve the operating oil therein even where the state continues for a long time that the solenoid valve 10 is exposed to the atmosphere with the spool valve 120 stopped in the initial state.

Sixth Embodiment

Figure 8:
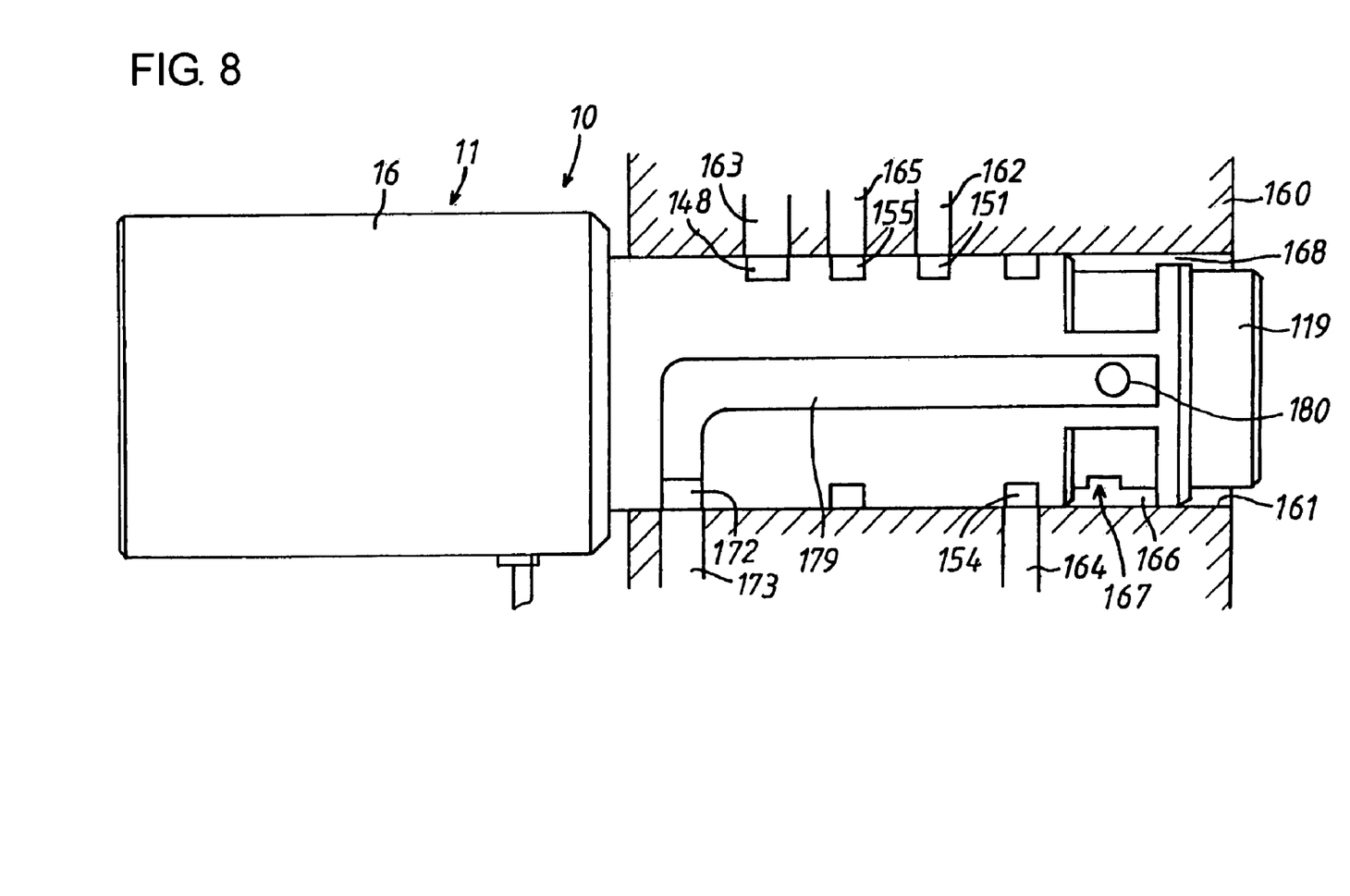
FIG. 8 is a partly sectional view of another solenoid valve in a sixth embodiment according to the present invention.

Next, description will be made regarding a solenoid valve 10 of the normally open type in a sixth embodiment according to the present invention. The solenoid valve 10 in the sixth embodiment differs from that in the third embodiment shown in FIG. 5 in that the sub-drain port 172 is made to communicate directly with the spring chamber 156 instead of making the main drain passage 164 communicate with the annular oil groove 166 through the lead passage 170. Specifically, as shown in FIG. 8, a communication groove 179 is formed on the external surface of the sleeve 119 to extend from the sub-drain port 172 to over the spring chamber 156 and is in communication with the sub-drain passage 173 at one end thereof and the spring chamber 156 at the other end thereof through a throttle hole 180 opening to the external surface of the spring chamber 156.

Thus, where the state continues for a long time that the spool valve 120 is held stopped at one stroke end thereof as a result of applying the maximum control current to the coil 29 in order to keep the controlled pressure from the output port 151 low, the operating oil under the lowest controlled pressure supplied to the feedback port 148 flows into the sub-drain port 172 through the clearance between the spool valve 120 and the valve hole 118, and the operating oil then flows into the spring chamber 156 from the communication groove 179 which makes the sub-drain port 172 communicate directly with the spring chamber 156 and is then supplied to the annular oil groove 166 through the throttle hole 167. Also where the state continues for a long time that the spool valve 120 is held stopped at the other stroke end thereof as a result of applying the minimum control current to the coil 29 in order to keep the controlled pressure from the output port 151 high, the operating oil under the highest controlled pressure supplied to the feedback port 148 through the feedback passage 163 communicating with the output port 151 flows into the sub-drain port 172 through the clearance between the spool valve 120 and the valve hole 118, and the operating oil then flows into the spring chamber 156 from the communication groove 179 which makes the sub-drain port 172 communicate directly with the spring chamber 156, and is then supplied to the annular oil groove 166 through the throttle hole 167. Accordingly, it can be realized to continuously supply the operating oil to the spring chamber 156 and to reserve the operating oil therein even where the state continues for a long time that the solenoid valve 10 is exposed to the atmosphere with the spool valve 120 stopped in the initial state.

Seventh Embodiment

Figure 9:
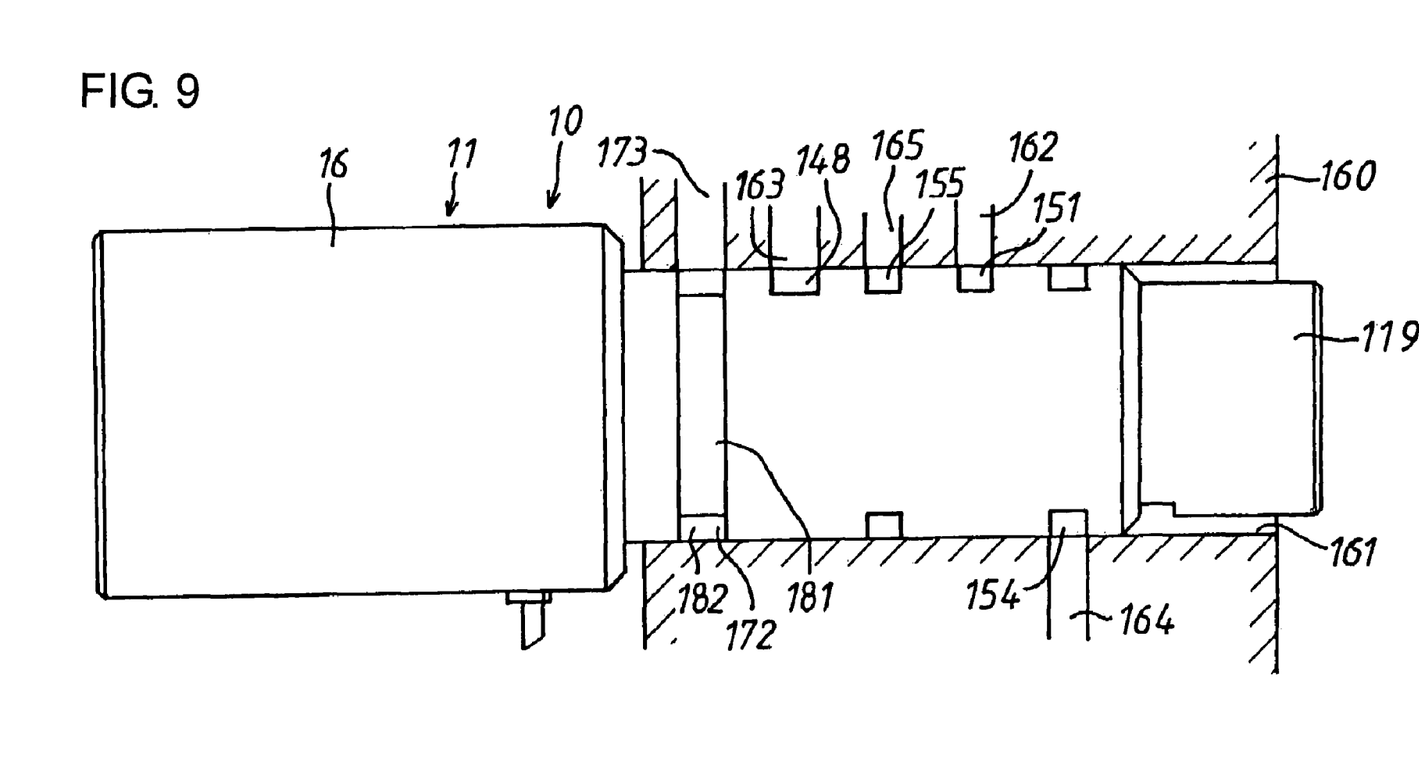
FIG. 9 is a partly sectional view of another solenoid valve in a seventh embodiment according to the present invention.

Next, description will be made regarding a solenoid valve 10 of the normally open type in a seventh embodiment according to the present invention. The solenoid valve 10 in the seventh embodiment differs from that in the sixth embodiment shown in FIG. 8 in that an annular oil groove is formed on the external surface of the valve sleeve 119 at a portion where the sub-drain port 172 is formed, instead of being formed as that 166 around the spring chamber 156 in the sixth embodiment. Specifically, as shown in FIG. 9, an annular oil groove 181 is formed between the feedback passage 163 and an end on the solenoid section 11 side of the insertion bore 161 and at a portion on the external surface of the sleeve 119 corresponding to the sub-drain port 172. A sub-drain passage 173 is formed on the valve body 160 to communicate with an upper part of the annular oil groove 181, and the sub-drain port 172 is in communication with a lower part of the annular oil groove 181 through a communication or respiration passage 182 which is made as throttle hole having a throttle resistance.

Since the annular oil groove 181 communicates at its upper part with the sub-drain passage 173, it is possible to store the operating oil to the height corresponding to the upper part of the annular oil groove 181 and to reserve the operating oil in the sub-drain port 172. Thus, when the coil 29 is energized for controlling the controlled pressure from the output port 162 and hence when the spool valve 120 together with the plunger 17 is moved against the resilient force of the spring 132 as a result of the plunger 17 being axially attracted in proportion to the electromagnetic force, the spool valve 120 can be prevented from generating the self oscillation by the dumping effect of the operating oil reserved in the sub-drain port 172.

Where the state continues for a long time that the plunger 17 and hence, the spool valve 120 are held stopped at one stroke end thereof as a result of applying the maximum control current to the coil 29 in order to keep the controlled pressure from the output port 151 low, the operating oil under the lowest controlled pressure supplied to the feedback passage 163 flows into the sub-drain port 172 through the clearance between the spool valve 120 and the valve hole 118, then is supplied to the annular oil groove 181 and is discharged from the upper part of the annular oil groove 181 to the sub-drain passage 173. Also where the state continues for a long time that the spool valve 120 is held stopped at the other stroke end thereof as a result of applying the minimum control current to the coil 29 in order to keep the controlled pressure from the output port 151 high, the operating oil under the highest controlled pressure supplied to the feedback port 148 through the feedback passage 163 communicating with the output port 151 flows into the sub-drain port 172 through the clearance between the spool valve 120 and the valve hole 118, and the operating oil is then supplied to the annular oil groove 181. Accordingly, it can be realized to continuously reserve the operating oil in the sub-drain port 172 even where the state continues for a long time that the solenoid valve 10 is exposed to the atmosphere with the spool valve 120 stopped in the initial state.

Figure 1:
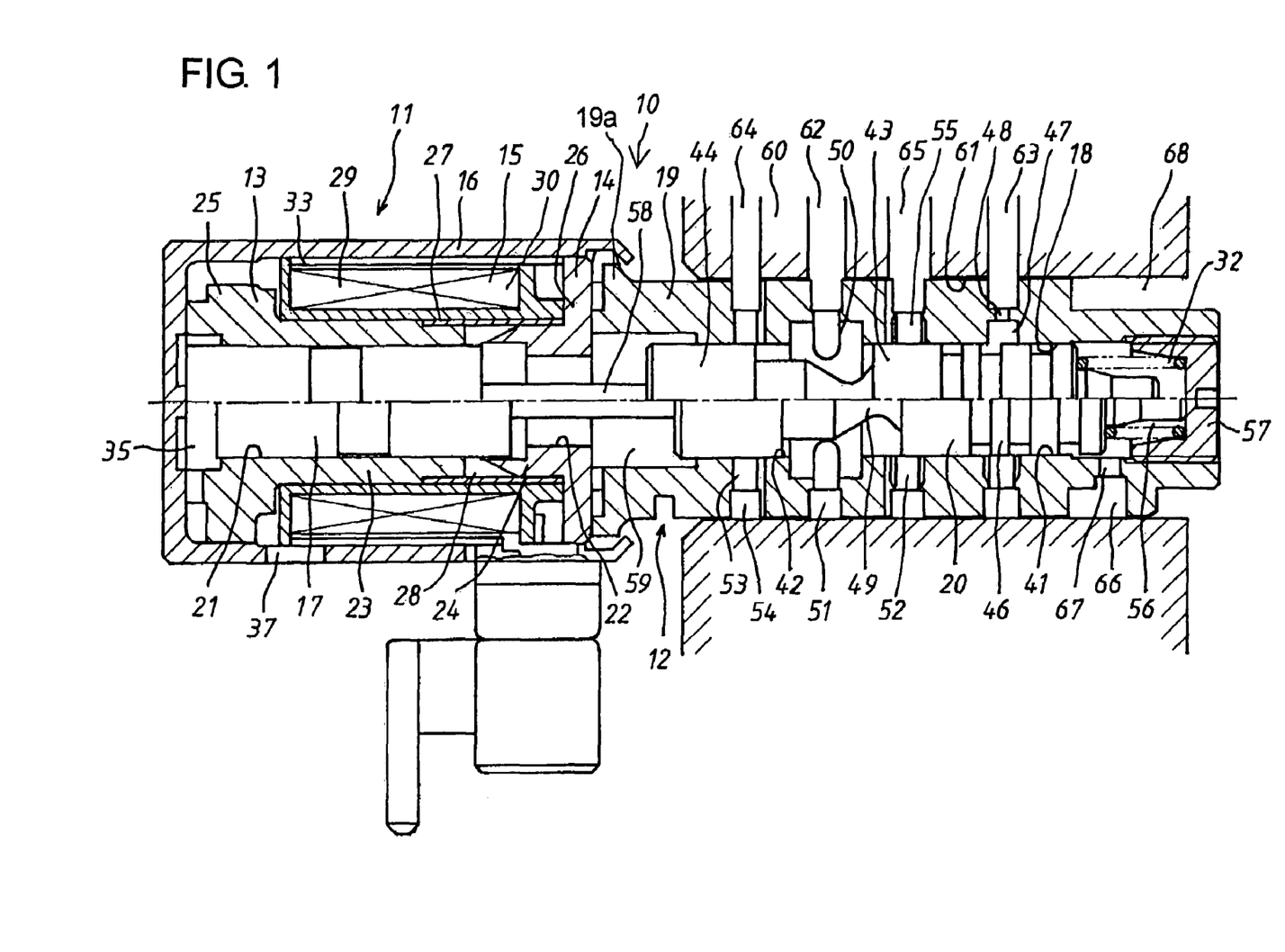
FIG. 1 is a sectional view of a solenoid valve in a first embodiment according to the present invention.

Various features and many of the attendant advantages in the foregoing embodiments will be summarized as follows:

In the solenoid valve 10 of the normally closed type in the first embodiment typically shown in FIG. 1, since the upper part of the annular oil groove 66 communicates with the outside of the insertion bore 61 through the drain passage 68, it can be realized to store the operating oil in the annular oil groove 66 to the height of the upper part thereof and hence, to reserve the operation oil in the spring chamber 56 communicating with the annular oil groove 66 through the respiration passage 67. Thus, when the plunger 17 is attracted to be axially moved in dependence on an electromagnetic force exerted thereon as the coil 29 is energized to control the controlled pressure from the output port 51 and when the spool valve 20 is moved together with the plunger 17 against the resilient force of the spring 32, the spool valve 20 is prevented from generating the self oscillation by the damping effect of the operating oil reserved in the spring chamber 32.

Where the state continues for a long time that the plunger 17 and hence, the spool valve 20 remain stopped at one stroke end thereof as a result of applying the maximum control current to the coil 29 in order to keep the controlled pressure from the output port 51 high, the operating oil under the highest controlled pressure which is supplied from the output port 51 to the feedback port 48 flows into the spring chamber 56 through the clearance between the spool valve 20 and the valve hole 18, is then supplied from the spring chamber 56 through the respiration passage 67 to the annular oil groove 66, and is further discharged to the outside of the insertion bore 61 through the drain passage 68. Also where the state continues for a long time that the spool valve 20 remains stopped at the other stroke end thereof as a result of applying the minimum control current to the coil 29 in order to keep the controlled pressure from the output port 51 low, the operating oil under the lowest controlled pressure supplied to the feedback port 48 flows into the spring chamber 56 through the clearance between the spool valve 20 and the valve hole 18. Accordingly, it can be realized to continuously supply and reserve the operating oil in the spring chamber 56 even where the state continues for a long time that the solenoid valve 10 is exposed to the atmosphere with the spool valve 20 stopped in the initial state. This advantageously prevents the spool valve 20 from generating the self oscillation by the damping effect of the operating oil reserved in the spring chamber 56 when the spool valve 20 is moved from the stop state.

In the solenoid valve 10 of the normally closed type in the second embodiment shown in FIG. 4, when the maximum control current is applied to the coil 29, the operating oil acting in the feedback port 48 is supplied to the spring chamber 56 through the clearance between the spool valve 20 and the valve hole 18 and is supplied from the spring chamber 56 to the annular oil groove 66 through the respiration passage 67. When the minimum control current is applied to the coil 29, on the contrary, the control pressure in the feedback port 48 is lowered to make the operating oil hardly flow from the feedback port 48 into the spring chamber 56, in which case, however, the operating oil is supplied from the communication groove 69 communicating with the main drain port 54, to the annular oil groove 66. Accordingly, it can be realized to supply the operating oil to the annular oil groove 66 all the time and hence, to reserve the operating oil in the spring chamber 56.

In the solenoid valve 10 of the normally open type in the third embodiment shown in FIGS. 5(*a*) and 5(*b*), where the state continues for a long time that the spool valve 120 is held stopped at one stroke end thereof as a result of applying the maximum control current to the coil 29 in order to keep the controlled pressure from the output port 151 low, the operating oil discharged to the main drain port 154 flows from the lead passage 170 into the annular oil groove 166, is supplied to the spring chamber 156 through the respiration passage 167 and then is discharged from the drain passage 168 to the outside of the insertion bore 161. Also where the state continues for a long time that the spool valve 120 is held stopped at the other stroke end thereof as a result of applying the minimum control current to the coil 29 in order to keep the controlled pressure from the output port 151 high, the operating oil discharged to the main drain port 154 decrease, in which case, however, it does not occur due to the throttle resistance of the lead passage 170 that the operating oil flows out of the annular oil groove 166 into the main drain port 154. Rather, the operating oil flows a little from the main drain port 154 into the annular oil groove 166 to be supplied to the spring chamber 156 through the respiration passage 167. Accordingly, it can be realized to continuously supply the operating oil to the spring chamber 156 and to reserve the operating oil therein even where the state continues for a long time that the solenoid valve 10 is exposed to the atmosphere with the spool valve 120 stopped in the initial state. This advantageously prevents the spool valve 120 from generating the self oscillation by the damping effect of the operating oil reserved in the spring chamber 156 when the spool valve 120 is moved from the stop state.

In the solenoid valve 10 of the normally open type in the fourth embodiment shown in FIG. 6, where the state continues for a long time that the spool valve 120 is held stopped at one stroke end thereof as a result of applying the maximum control current to the coil 29 in order to keep the controlled pressure from the output port 151 low, the operating oil discharged to the main drain port 154 flows into the spring chamber 156 through the communication groove 175, then is supplied to the annular oil groove 166 through the respiration passage 167, and is discharged from the drain passage 168 to the outside of the insertion bore 161. Also where the state continues for a long time that the spool valve 120 is held stopped at the other stroke end thereof as a result of applying the minimum control current to the coil 29 in order to keep the controlled pressure from the output port 151 high, the operating oil discharged to the main drain port 154 flows into the spring chamber 156 through the communication groove 175 and then is supplied to the annular oil groove 166 through the respiration passage 167. Accordingly, it can be realized to continuously supply the operating oil to the spring chamber 156 and to reserve the operating oil therein even where the state continues for a long time that the solenoid valve 10 is exposed to the atmosphere with the spool valve 120 stopped in the initial state.

In the solenoid valve 10 of the normally open type in the fifth embodiment shown in FIG. 7, where the state continues for a long time that the spool valve 120 is held stopped at one stroke end thereof as a result of applying the maximum control current to the coil 29 in order to keep the controlled pressure from the output port 151 low, the operating oil under the lowest controlled pressure supplied to the feedback port 148 flows into the sub-drain port 172 through the clearance between the spool valve 120 and the valve hole 118, and the operating oil then flows into the annular oil groove 166 from the communication groove 178 which makes the sub-drain port 172 communicate with the annular oil groove 166, and is then supplied to the spring chamber 156 through the respiration passage 167. Also where the state continues for a long time that the spool valve 120 is held stopped at the other stroke end thereof as a result of applying the minimum control current to the coil 29 in order to keep the controlled pressure from the output port 151 high, the operating oil under the highest controlled pressure supplied from the output port 151 to the feedback port 148 flows into the sub-drain port 172 through the clearance between the spool valve 120 and the valve hole 118, and the operating oil then flows into the annular oil groove 166 from the communication groove 178 which makes the sub-drain port 172 communicate with the annular oil groove 166, and is then supplied to the spring chamber 156 through the respiration passage 167. Accordingly, it can be realized to continuously supply the operating oil to the spring chamber 156 and to reserve the operating oil therein even where the state continues for a long time that the solenoid valve 10 is exposed to the atmosphere with the spool valve 120 stopped in the initial state.

In the solenoid valve 10 of the normally open type in the sixth embodiment shown in FIG. 8, where the state continues for a long time that the spool valve 120 is held stopped at one stroke end thereof as a result of applying the maximum control current to the coil 29 in order to keep the controlled pressure from the output port 151 low, the operating oil under the lowest controlled pressure supplied to the feedback port 148 flows into the sub-drain port 172 through the clearance between the spool valve 120 and the valve hole 118, and the operating oil then flows into the spring chamber 156 from the communication groove 179 which makes the sub-drain port 172 communicate with the spring chamber 156, and is then supplied to the annular oil groove 166 through the respiration passage 167. Also where the state continues for a long time that the spool valve 120 is held stopped at the other stroke end thereof as a result of applying the minimum control current to the coil 29 in order to keep the controlled pressure from the output port 151 high, the operating oil under the highest controlled pressure supplied from the output port 151 to the feedback port 148 flows into the sub-drain port 172 through the clearance between the spool valve 120 and the valve hole 118, and the operating oil then flows into the spring chamber 156 from the communication groove 179 which makes the sub-drain port 172 communicate with the spring chamber 156, and is then supplied to the annular oil groove 166 through the respiration passage 167. Accordingly, it can be realized to continuously supply the operating oil to the spring chamber 156 and to reserve the operating oil therein even where the state continues for a long time that the solenoid valve 10 is exposed to the atmosphere with the spool valve 120 stopped in the initial state.

In the solenoid valve 10 of the normally open type in the seventh embodiment shown in FIG. 9, since the upper part of the annular oil groove 181 communicates with the sub-drain passage 173, it can be realized to store the operating oil in the annular oil groove 181 to the height of the upper part thereof and hence, to reserve the operation oil in the sub-drain port 172. Thus, when the plunger 17 is attracted to be axially moved in dependence on an electromagnetic force exerted thereon as the coil 29 is energized to control the controlled pressure from the output port 151 and when the spool valve 120 is moved together with the plunger 17 against the resilient force of the spring 132, the spool valve 120 is prevented from generating the self oscillation by the damping effect of the operating oil reserved in the spring chamber 132.

Where the state continues for a long time that the plunger 17 and hence, the spool valve 120 are held stopped at one stroke end thereof as a result of applying the maximum control current to the coil 29 in order to keep the controlled pressure from the output port 151 low, the operating oil under the lowest controlled pressure supplied to the feedback port 163 flows into the sub-drain port 172 through the clearance between the spool valve 120 and the valve hole 118, then is supplied to the annular oil groove 181 and is discharged from the upper part of the annular oil groove 181 through the sub-drain passage 173 to the outside. Also where the state continues for a long time that the spool valve 120 is held stopped at the other stroke end thereof as a result of applying the minimum control current to the coil 29 in order to keep the controlled pressure from the output port 151 high, the operating oil under the highest controlled pressure supplied to the feedback port 148 through the feedback passage 163 communicating with the output port 151 flows into the sub-drain port 172 through the clearance between the spool valve 120 and the valve hole 118, and the operating oil is then supplied to the annular oil groove 181. Accordingly, it can be realized to continuously reserve the operating oil in the sub-drain port 172 even where the state continues for a long time that the solenoid valve 10 is exposed to the atmosphere with the spool valve 120 stopped in the initial state.

In the solenoid valve 10 in any of the foregoing embodiments as typically shown in FIGS. 1 and 5(a), the respiration passage 67 (or 167) is made as throttle hole having a throttle resistance. Thus, when the spool valve 20 (or 120) is moved together with the plunger 17 against the resilient force of the spring 32 (or 132) as the plunger 17 is axially attracted in dependence on the electromagnetic force exerted thereon as a result of energizing the coil 29 in order to control the controlled pressure from the output port 51 (or 151), the speed at which the operating oil reserved in the spring chamber 32 (or 132) or the sub-drain port 172 flows relative to the annular oil groove 66 (or 166, 181) upon movement of the spool 20 (or 120) is made to be slow to secure a proper damping effect.

Obviously, further numerous modifications and variations of the present invention are possible in light of the above teachings. It is therefore to be understood that within the scope of the appended claims, the present invention may be practiced otherwise than as specifically described herein.

What is claimed is:

1. A solenoid valve of the normally closed type comprising:
  a solenoid section having a plunger axially attracted in dependence on electric current applied to a coil;
  a sleeve joined with the solenoid section and having a valve hole formed on the same axis as the plunger;
  a spool valve slidably fitted in the valve hole and urged to be brought into contact with the plunger by the resilient force of a spring retained in a spring chamber formed at a portion opposite the solenoid section, the spool valve being movable together with the plunger for controlling flow path areas of a supply port, an output port and a main drain port which open to the valve hole;
  a valve body having an insertion bore which is formed to pass therethrough and in which the sleeve is fitted to extend its axis approximately horizontally;
  a feedback port opening to the valve hole to be next to the spring chamber for leading a controlled pressure output from the output port, to a feedback land portion which is formed on the spool valve to have an area difference;
  wherein when the plunger is axially attracted to move the spool valve upon energization of the coil, the area of a flow path from the supply port to the output port is gradually increased as the area of a flow path from the output port to the main drain port is gradually decreased, and wherein the solenoid valve further comprises:
  an annular oil groove formed between the feedback port and an open end on the spring chamber side of the insertion bore of the valve body and at a portion corresponding to the spring chamber on the external surface of the sleeve;
  a drain passage formed on the external surface of an upper part of the sleeve to extend from the annular oil groove to an end of the sleeve for making an upper part of the annular oil groove communicate with the outside of the insertion bore; and
  a respiration passage extending through a lower part of the sleeve opposite the drain passage and connecting a lower part of the annular oil groove with a lower part of the spring chamber for making the annular oil groove communicate with the spring chamber, whereby an oil reserve is formed below the height of the drain passage.

2. The solenoid valve as set forth in claim 1, wherein the respiration passage is constituted by a throttle hole having a throttle resistance.

3. The solenoid valve as set forth in claim 1, further comprising a communication groove formed on the external surface of the sleeve for making the main drain port communicate with the annular oil groove.

4. The solenoid valve as set forth in claim 3, wherein the respiration passage is constituted by a throttle hole having a throttle resistance.

5. A solenoid valve of the normally open type comprising:
  a solenoid section having a plunger axially attracted in dependence on electric current applied to a coil;
  a sleeve joined with the solenoid section and having a valve hole formed on the same axis as the plunger;
  a spool valve slidably fitted in the valve hole and urged to be brought into contact with the plunger by the resilient force of a spring retained in a spring chamber formed at a portion opposite the solenoid section, the spool valve being movable together with the plunger for controlling flow path areas of a supply port, an output port and a main drain port which open to the valve hole;
  a valve body having an insertion bore which is formed to pass therethrough and in which the sleeve is fitted to extend its axis approximately horizontally; and
  the main drain port opening to the valve hole to be next to the spring chamber;
  wherein when the plunger is axially attracted to move the spool valve upon energization of the coil, the area of a flow path from the supply port to the output port is gradually decreased as the area of a flow path from the output port to the main drain port is gradually increased, and wherein the solenoid valve further comprises:
  an annular oil groove formed between the main drain port and an open end on the spring chamber side of the insertion bore of the valve body and at a portion corresponding to the spring chamber on the external surface of the sleeve;
  a drain passage formed on the external surface of an upper part of the sleeve to extend from the annular oil groove to an end of the sleeve for making an upper part of the annular oil groove communicate with the outside of the insertion bore;
  a respiration passage extending through a lower part of the sleeve opposite the drain passage and connecting a lower part of the annular oil groove with a lower part of the spring chamber for making the annular oil groove communicate with the spring chamber, whereby an oil reserve is formed below the height of the drain passage; and a lead passage for making the lower part of the annular oil groove communicate with the main drain passage.

6. The solenoid valve as set forth in claim 5, wherein the respiration passage is constituted by a throttle hole having a throttle resistance.

7. A solenoid valve of the normally open type comprising:
a solenoid section having a plunger axially attracted in dependence on electric current applied to a coil;
a sleeve joined with the solenoid section and having a valve hole formed on the same axis as the plunger;
a spool valve slidably fitted in the valve hole and urged to be brought into contact with the plunger by the resilient force of a spring retained in a spring chamber formed at a portion opposite the solenoid section, the spool valve being movable together with the plunger for controlling flow path areas of a supply port, an output port and a main drain port which open to the valve hole;
a valve body having an insertion bore which is formed to pass therethrough and in which the sleeve is fitted to extend its axis approximately horizontally; and
the main drain port opening to the valve hole to be next to the spring chamber;
wherein when the plunger is axially attracted to move the spool valve upon energization of the coil, the area of a flow path from the supply port to the output port is gradually decreased as the area of a flow path from the output port to the main drain port is gradually increased, and wherein the solenoid valve further comprises:
an annular oil groove formed between the main drain port and an open end on the spring chamber side of the insertion bore of the valve body and at a portion corresponding to the spring chamber on the external surface of the sleeve;
a drain passage formed on the external surface of an upper part of the sleeve to extend from the annular oil groove to an end of the sleeve for making an upper part of the annular oil groove communicate with the outside of the insertion bore;
a respiration passage extending through a lower part of the sleeve opposite the drain passage and connecting a lower part of the annular oil groove with a lower part of the spring chamber for making the annular oil groove communicate with the spring chamber, whereby an oil reserve is formed below the height of the drain passage; and
a communication groove formed on the external surface of the sleeve for making the main drain port communicate with the spring chamber.

8. The solenoid valve as set forth in claim 7, wherein the respiration passage is constituted by a throttle hole having a throttle resistance.

* * * * *